United States Patent
Yamauchi et al.

(10) Patent No.: US 10,155,454 B2
(45) Date of Patent: Dec. 18, 2018

(54) RECONFIGURABLE SEAT

(71) Applicant: TOYOTA BOSHOKU KABUSHIKI KAISHA, Aichi-ken (JP)

(72) Inventors: Katsuhito Yamauchi, Aichi-ken (JP); Nobuki Hayashi, Aichi-ken (JP); Tokuyuki Nishikawa, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/835,982

(22) Filed: Dec. 8, 2017

(65) Prior Publication Data
US 2018/0162236 A1 Jun. 14, 2018

(30) Foreign Application Priority Data
Dec. 13, 2016 (JP) .................. 2016-241018

(51) Int. Cl.
| | |
|---|---|
| *B60N 2/02* | (2006.01) |
| *B60N 2/38* | (2006.01) |
| *B60N 2/24* | (2006.01) |
| *A47C 7/56* | (2006.01) |
| *A47C 3/34* | (2006.01) |

(52) U.S. Cl.
CPC .................. *B60N 2/02* (2013.01); *A47C 3/34* (2013.01); *A47C 7/56* (2013.01); *B60N 2/24* (2013.01); *B60N 2/38* (2013.01); *B60N 2002/0208* (2013.01); *B60N 2002/247* (2013.01)

(58) Field of Classification Search
CPC .. A47C 7/56; A47C 13/00; A47C 3/18; A47C 3/34; B60N 2002/0208; B60N 2/02; B60N 2/38; B60N 2/24; B60N 2002/247

USPC .................. 297/1, 105, 111, 118, 283.1, 331
See application file for complete search history.

(56) References Cited

U.S. PATENT DOCUMENTS

| | | | | |
|---|---|---|---|---|
| 160,641 | A * | 3/1875 | Borel .................... | B60N 2/305 297/331 |
| 299,875 | A * | 6/1884 | Stone .................... | B60N 2/3065 297/334 |
| 2015/0282623 | A1* | 10/2015 | Reddig .................. | A47C 1/024 297/331 |

FOREIGN PATENT DOCUMENTS

JP 2012-116218 6/2012

\* cited by examiner

*Primary Examiner* — Milton Nelson, Jr.
(74) *Attorney, Agent, or Firm* — Greenblum & Bernstein, P.L.C.

(57) ABSTRACT

A seat surface part is switchable by a switching mechanism between a forward-unfolded posture in which the seat surface part is forwardly unfolded down so that a first support surface comes into a state at a low position where the seated person lowers his or her body to sit, and a second support surface comes into a state of forming a backwardly inclined surface that is inclined backwardly downward, and a folded-up posture in which the seat surface part is folded up backward from the forward-unfolded posture so that the second support surface is lifted up at a higher position than a position of the first support surface in the forward-unfolded posture, and an upper surface inclined forwardly downward is formed by the backwardly inclined surface so that the second support surface comes into a state at a high position where the seated person perches in a standing posture.

2 Claims, 5 Drawing Sheets

RECONFIGURABLE SEAT

INCORPORATION BY REFERENCE

The disclosure of Japanese Patent Application No. 2016-241018 filed on Dec. 13, 2016 including the specification, drawings and abstract is incorporated herein by reference in its entirety.

BACKGROUND

1. Technical Field

The present disclosure relates to a seat. Specifically, the present disclosure relates to a seat having a seat surface part serving as a stool for a seated person.

2. Description of Related Art

Conventionally, as a seat provided for a vehicle such as an industrial vehicle, there has been known a perching-type seat that allows a seated person to sit thereon in a nearly standing posture (Japanese Parent Application Publication No. 2012-116218). The above seat is configured such that a seat surface part of the seat to support the seated person's buttock is formed in a shape that is inclined forwardly downward. The above configuration allows the seated person to perch on the seat surface part in a state in which an angle of his or her pelvis is close to the angle thereof in the standing posture, so that the seated person can have a perching posture with less fatigue feeling.

SUMMARY

In the above related art, the seat surface part cannot be switched to a state that allows the seated person to lower his or her body to sit thereon, so that the seat surface part can be used only in the perching posture. An object of the present disclosure is to provide a seat capable of properly switching a seat surface part between a state corresponding to a perching posture (posture in which a seated person lightly perches on a seat surface in a nearly standing posture) and a state corresponding to a sitting posture.

An aspect of the present disclosure is a seat having a seat surface part serving as a stool for a seated person, and the seat has a switching mechanism that forwardly unfolds down or backwardly folds up the seat surface part by turning the seat surface part relative to a floor surface. With this switching mechanism, the seat surface part can be switched between a forward-unfolded posture in which the seat surface part is forwardly unfolded down so that a first support surface facing upward comes into a state at a low position where the seated person can lower his or her body to sit thereon, and a second support surface facing frontward comes into a state of forming a backwardly inclined surface that is inclined backwardly downward, and a folded-up posture in which the seat surface part is folded up backward from the forward-unfolded posture so that the second support surface is lifted up at a higher position than a position of the first support surface in the forward-unfolded posture, and an upper surface inclined forwardly downward is formed by the backwardly inclined surface so that the second support surface comes into a state at a high position where the seated person can perch thereon in a standing posture.

According to this aspect, with the switching of the seat surface part by the switching mechanism, the seat surface part can be properly switched between the state corresponding to the perching posture and the state corresponding to the sitting posture. Specifically, by the second support surface forming the front surface inclined backwardly downward when the seat surface part is in the forward-unfolded posture, it is possible to form a space where the seated person's crura can be placed backward when the seat surface part is used in the forward-unfolded posture, and it is also possible to reasonably form the seat surface inclined forwardly downward that is suitable for supporting the seated person's buttock in the perching posture when the seat surface part is used in the folded-up posture.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment for implementing the present disclosure will be described with reference to drawings.

Figure 1:
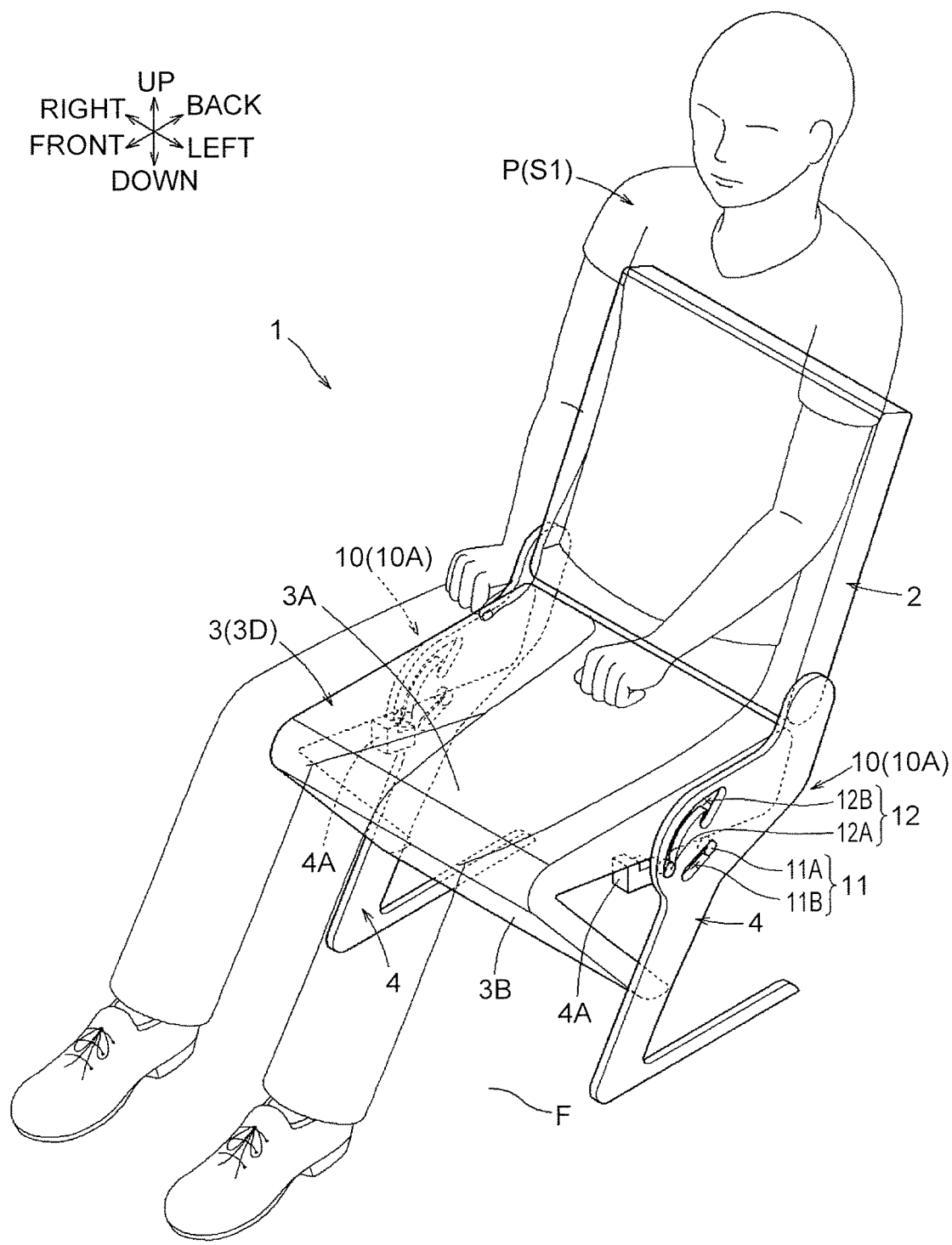
FIG. 1 is a perspective view showing a schematic configuration of a seat of an embodiment example 1.

First, a configuration of a seat 1 of an embodiment example 1 will be described with reference to FIG. 1 to FIG. 5. Respective directions such as frontward and backward, upward and downward, and right and left directions in the following description denote respective directions indicated in each drawing. As shown in FIG. 1, the seat 1 of the present embodiment is configured as a seat for a vehicle, and includes a backrest surface part 2 serving as a backrest for a seated person P, and a seat surface part 3 serving as a seating surface for the seated person P.

The backrest surface part 2 is provided such that lower ends on the right and left sides thereof are respectively fixed to a pair of right and left bases 4 placed on a floor surface F of the vehicle. A front surface of the backrest surface part 2 serving as a backrest surface forms an inclined surface that is slightly inclined backward relative to a perpendicular direction. Side surface parts on the right and left sides of the seat surface part 3 are connected respectively to the pair of right and left bases 4 so as to be turnable in a longitudinal direction in a standing and lying-down manner. Specifically, the seat surface part 3 is configured to be switchable between a forward-unfolded posture 3D shown in FIG. 1 and FIG. 3 and a folded-up posture 3U shown in FIG. 2 and FIG. 4 by a switching mechanism 10 having a right-and-left pair configuration that is disposed between respective side surface parts on the right and left sides of the seat surface part 3 and the respective bases 4 on both sides.

Figure 2:
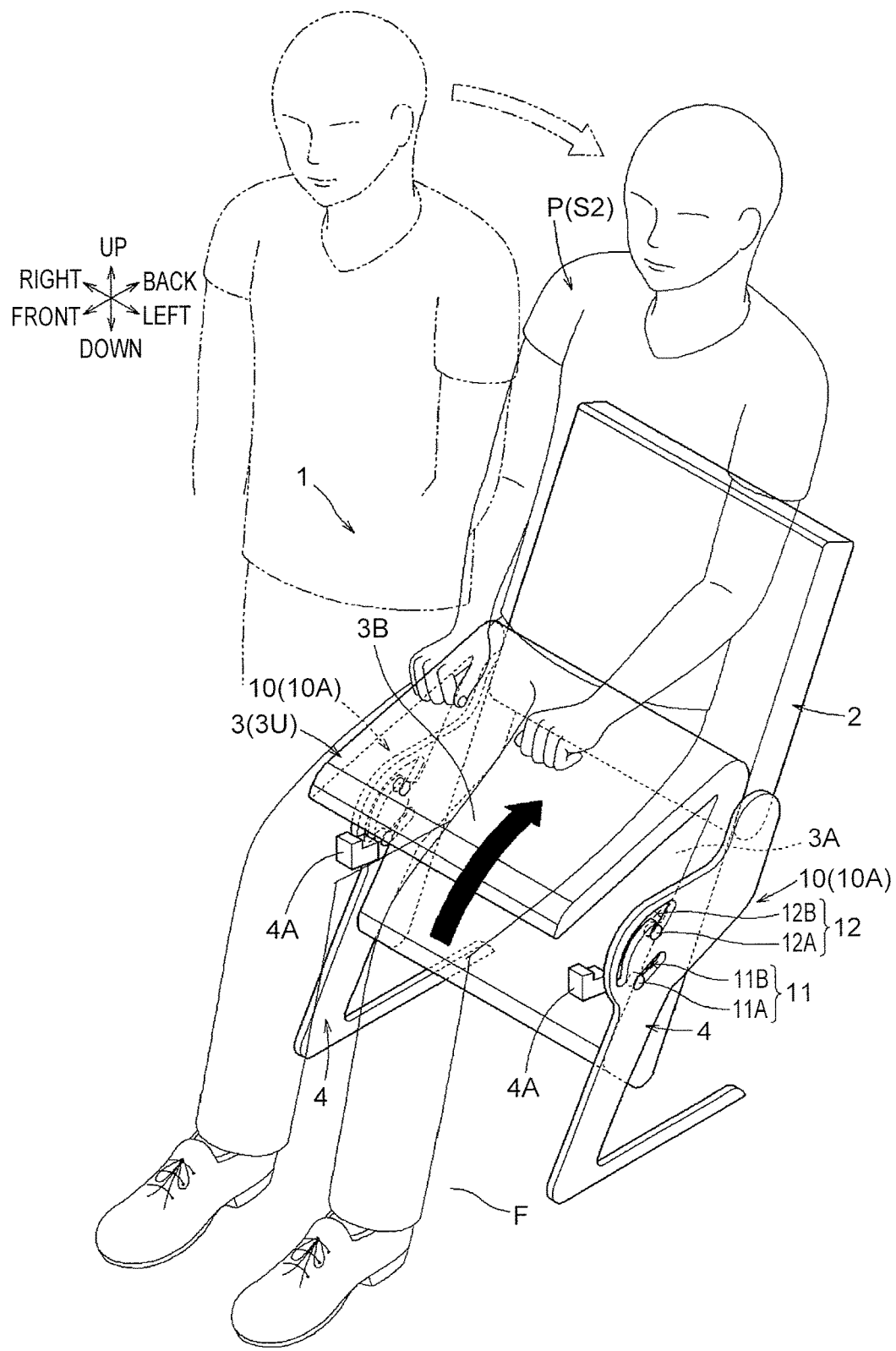
FIG. 2 is a perspective view showing a state in which a seat surface part is switched to a folded-up posture.

The seat surface part 3 is configured to be held in a state at a low position where the seated person P can sit in a sitting posture S1 with the seated person P's body being lowered, by switching the seat surface part 3 to the forward-unfolded posture 3D shown in FIG. 1 and FIG. 2. In addition, the seat surface part 3 is configured to be held in a state at a high position where the seated person P can perch in a perching posture S2 in which the seated person P perches in a standing posture, by switching the seat surface part 3 to the folded-up posture 3U shown in FIG. 2 and FIG. 4. The perching posture S2 allows the seated person P to take a posture with less fatigue feeling in which the seated person P has an angle of pelvis close to the angle thereof in the standing posture.

Figure 3:
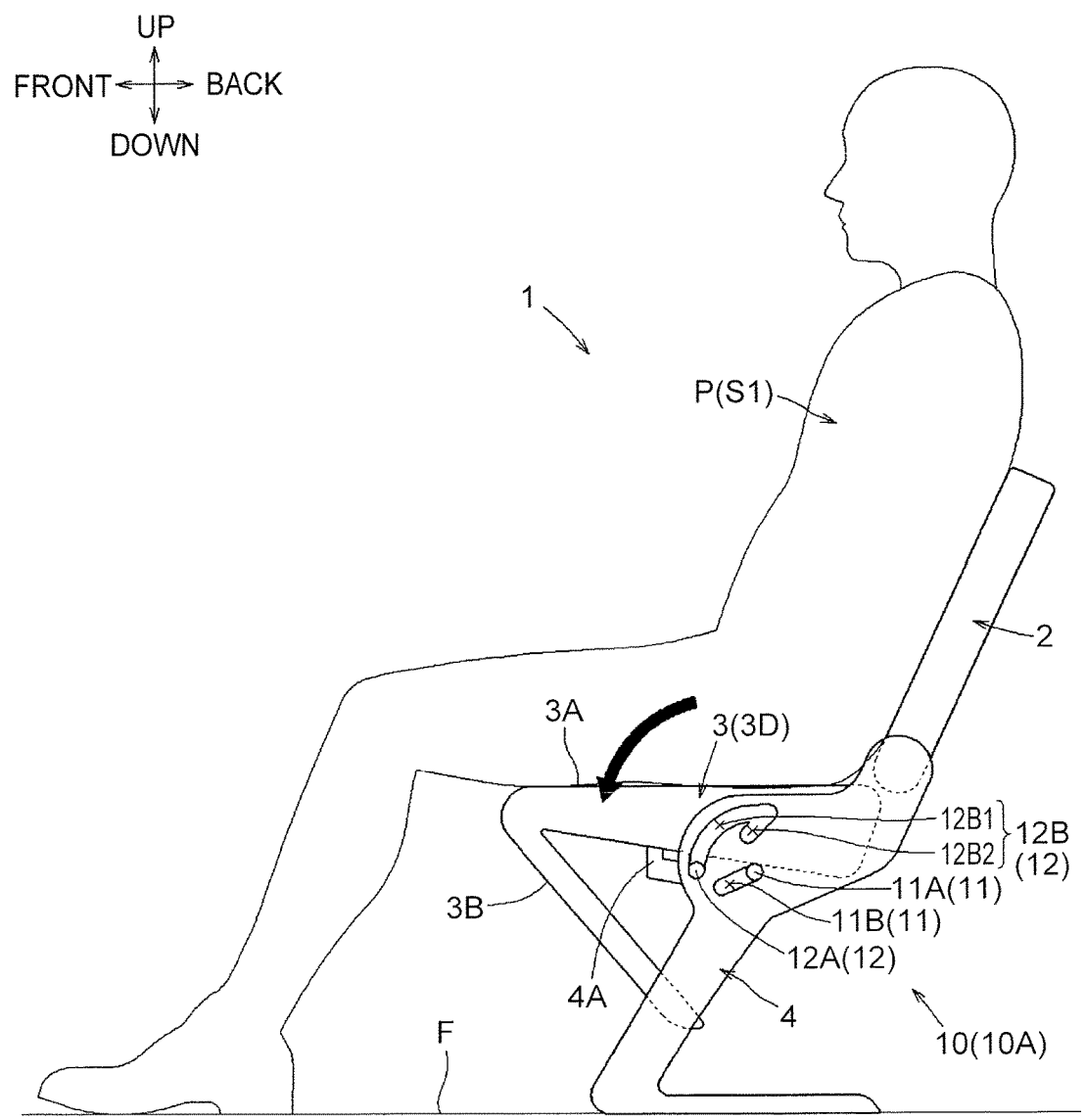
FIG. 3 is a side view showing a state in which the seat surface part is in a forward-unfolded posture.

Specifically, as shown in FIG. 1 and FIG. 3, the seat surface part 3 is formed by a single plate material having a substantially V-bend shape positioned in a lateral direction as viewed in a side view. In a state in which the seat surface part 3 is switched to the forward-unfolded posture 3D, a first support surface 3A whose surface faces upward comes into a state of forming a generally horizontal seating surface at a low position where the seated person P can sit with his or her body lowered. In addition, the seat surface part 3 has a second support surface 3B whose surface faces frontward, and the second support surface 3B forms a surface that is inclined in a backwardly downward direction. The second support surface 3B secures a space where the seated person P's crura can be placed backward when the seated person P sits on the seat surface part 3.

Figure 4:
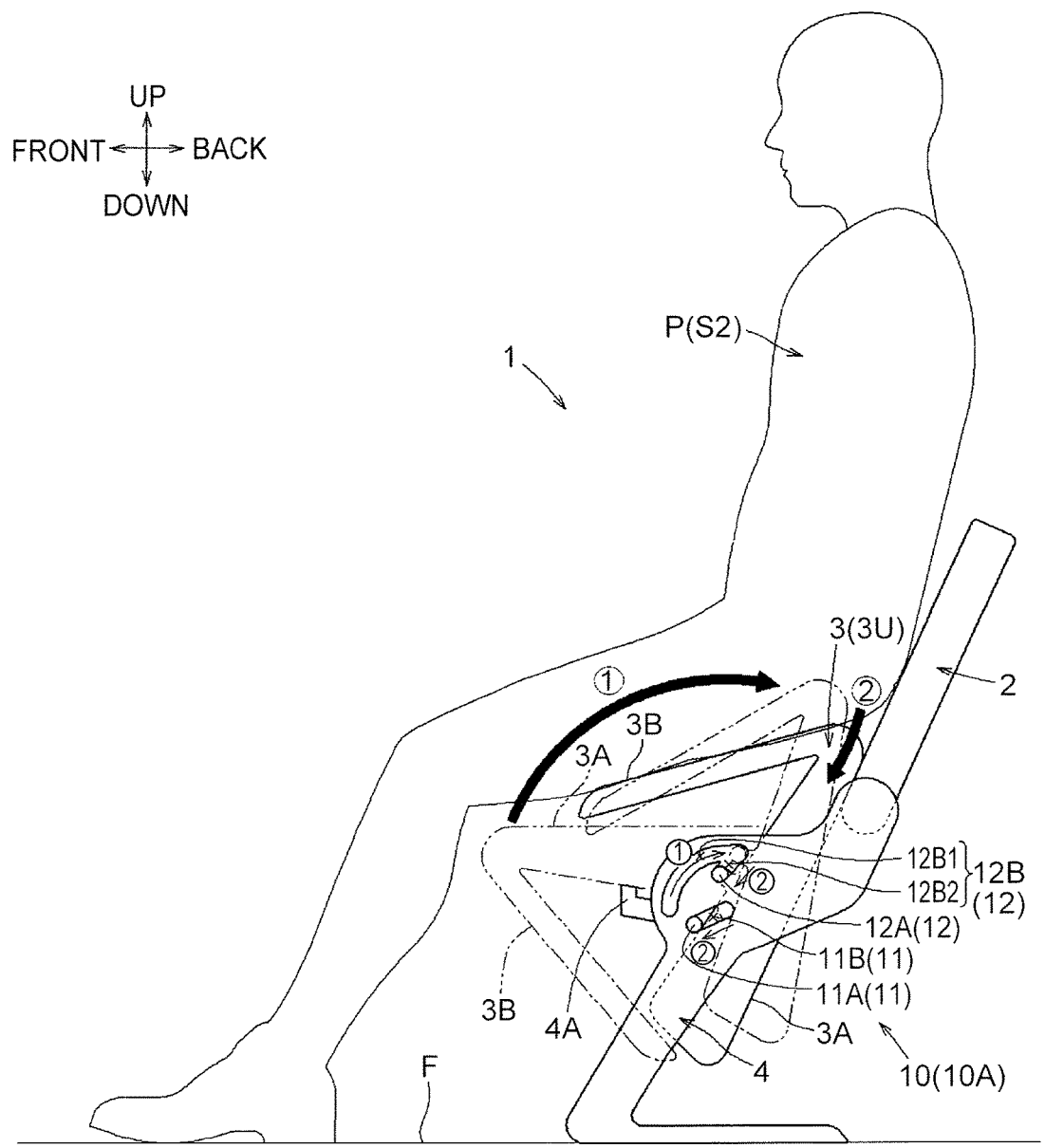
FIG. 4 is a side view showing a state in which the seat surface part is switched from the forward-unfolded posture to the folded-up posture.
Figure 5:
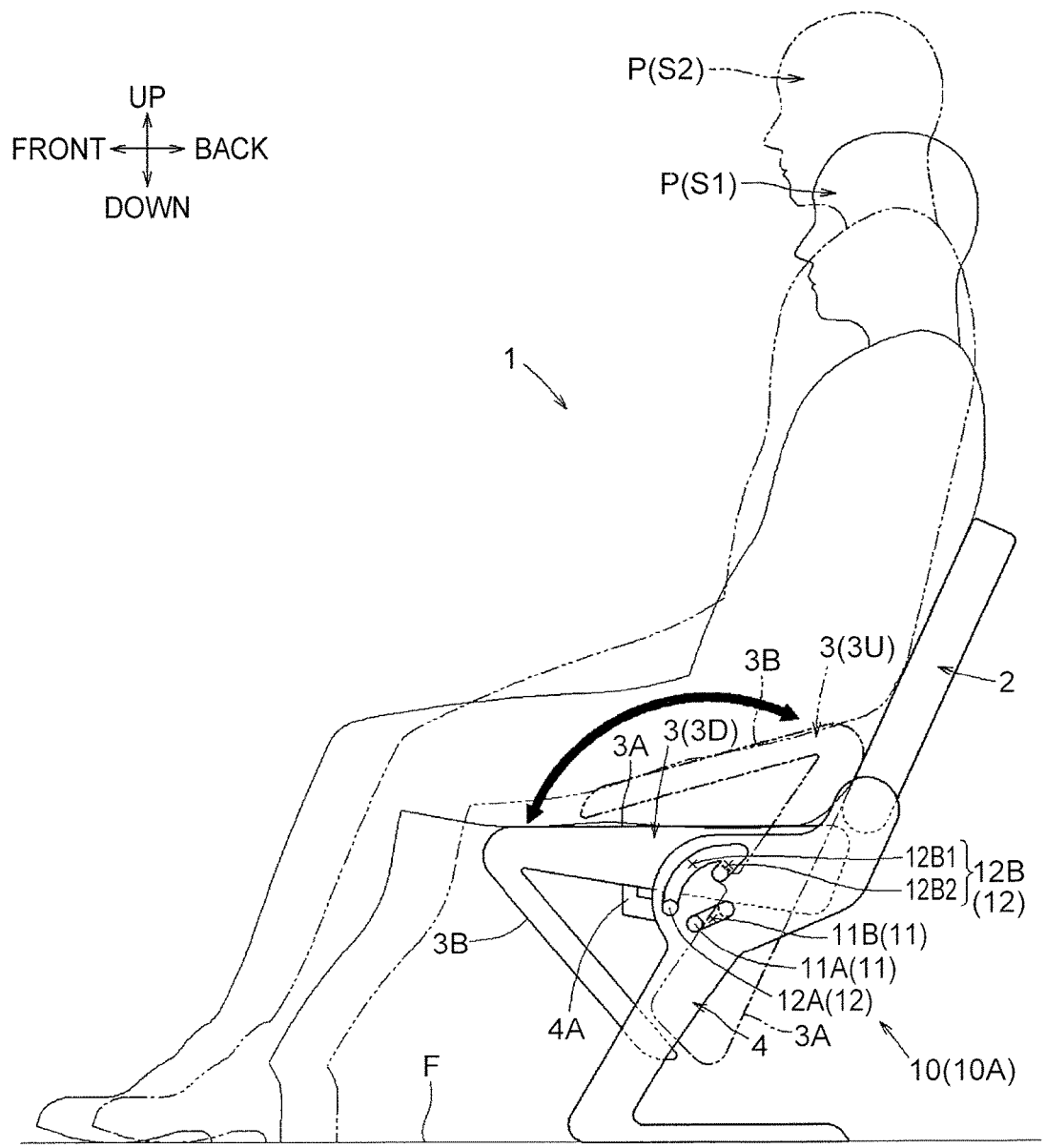
FIG. 5 is a side view showing that the forward-unfolded posture and the folded-up posture of the seat surface part overlap each other.

The seat surface part 3 is switched from the forward-unfolded posture 3D to the folded-up posture 3U shown in FIG. 2 and FIG. 4, so that the first support surface 3A is folded up backward at 90° or more from the position of the forward-unfolded posture 3D, and the first support surface 3A comes to a position where the first support surface 3A faces the front surface of the backrest surface part 2. The second support surface 3B of the seat surface part 3 is lifted up to a position higher than the position of the first support surface 3A in the forward-unfolded posture 3D, and thus is switched to a state in which the second support surface 3B forms an upper surface inclined forwardly downward. With this switching, the second support surface 3B inclined forwardly downward, which has been folded up to the high position, forms the seating surface where the seated person P can perch in the perching posture S2.

The second support surface 3B forming the sitting surface in the perching posture S2 forms the surface inclined forwardly downward, and thus the second support surface 3B comes into a state in which the surface thereof faces the seated person P's buttock in the perching posture S2; therefore, a front edge of the second support surface 3B becomes difficult to form a protruding shape pushing into the buttock of the seated person P. Accordingly, the seated person P perching on the seat surface part 3 can take the perching posture S2 with less fatigue feeling in which the angle of the pelvis comes close to the angle thereof in the standing posture, while the seated person P has comfortable sitting feeling with less foreign body sensation.

The switching mechanism 10 that switches the seat surface part 3 between the forward-unfolded posture 3D shown in FIG. 1 and FIG. 3 and the folded-up posture 3U shown in FIG. 2 and FIG. 4 has the following specific configuration. That is, as shown in FIG. 1 and FIG. 3, the switching mechanism 10 includes: pin-connecting parts 11 that turnably pin-connect the respective side surface parts on the right and the left sides of the seat surface part 3 to the corresponding bases 4 on both sides; and slide connecting parts 12 that are located at frontward positions apart from the corresponding pin-connecting parts 11, and connect the respective side surface parts on the right and the left sides of the seat surface part 3 to the corresponding bases 4 on both sides in such a manner that turning around the respective pin-connecting parts 11 can be released by sliding movements thereof. The switching mechanism 10 is configured to include a stopper 10A that can restrict forward fall-down of the seat surface part 3 when the seat surface part 3 is switched to the folded-up posture 3U.

Each of the pin-connecting parts 11 is composed by a connecting pin 11A in a round-bar shape projecting from each side surface part of the seat surface part 3 outward in a seat-width direction, and a lead-in hole 11B formed to be through the base 4 on each side in a manner as to straightly extend in an obliquely and forwardly downward direction. Each of the connecting pins 11A is inserted into each corresponding lead-in hole 11B from an inner side in the seat-width direction so that the connecting pin 11A is slidable and axially turnable only in the lead-in hole 11B in an extending direction of the lead-in hole 11B.

Each of the slide connecting parts 12 is composed by a slide pin 12A in a round-bar shape projecting outward in the seat-width direction from each side surface part of the seat surface part 3, and a long hole 12B formed to be through the base 4 on each side and curved in a substantially arc shape. Each of the slide pins 12A is inserted into each corresponding long hole 12B from the inner side in the seat-width direction so that the slide pin 12A is slidable and axially turnable only in the long hole 12B in an extending direction of the long hole 12B. As shown in FIG. 3, each of the long holes 12B include: a guide hole 12B1 curved in an arc shape formed around each corresponding connecting pin 11A when the connecting pin 11A is located at an upper backward end of each lead-in hole 11B; and a lead-in hole 12B2 extending in a shape straightly dropping downward from an upper backward end of the guide hole 12B1 in the forwardly downward direction.

The switching mechanism 10 is configured such that when the seat surface part 3 is in the forward-unfolded posture 3D, the connecting pin 11A of each pin-connecting part 11 is located at the upper backward end of each corresponding lead-in hole 11B, and the slide pin 12A of each slide connecting part 12 is located at the lower frontward end of the guide hole 12B1 of each long hole 12B. As configured above, the switching mechanism 10 can hold the seat surface part 3 in place against its gravitation by a force generated when the connecting pins 11 A of the pin-connecting parts 11 abut to the respective upper backward ends of the lead-in holes 11B, and a force generated when the slide pins 12A of the slide connecting parts 12 abut to the lower frontward ends of the guide holes 12B1 of the long holes 12B. When the seat surface part 3 is in the forward-unfolded posture 3D, a region of the seat surface part 3 located more frontward than each slide pin 12A is supported from a bottom side by a lower-support part 4A in an arm shape extending frontward from each base 4.

In the switching mechanism 10, from the state in which the seat surface part 3 is in the forward-unfolded posture 3D, by a user's operation of lifting up the seat surface part 3 in the backward direction, the slide pin 12A of each slide connecting part 12 moves in the upper backward direction along a hole shape of each guide hole 12B1, around the connecting pin 11A located at the upper backward end of the lead-in hole 11B of each pin-connecting part 11. At this time, each connecting pin 11A serving as a turning center of each pin-connecting part 11 is held in place while being pushed against the upper backward end of each lead-in hole 11B by action of operation force of lifting up the seat surface part 3 in the backward direction.

When the seat surface part 3 is lifted up backward in the above manner, as a state indicated by an imaginary line of FIG. 4, the slide pin 12A of each slide connecting part 12 reaches the upper backward end of the guide hole 12B1 to be locked. In this state, by operating the seat surface part 3 to be returned to the previous forward-unfolded direction, the seat surface part 3 is turned around the connecting pin 11A of each pin-connecting part 11 to be returned to the forward unfolded direction again. However, by operating the seat surface part 3 to be dropped down as it is in the gravity direction from the locking state of lifting up the seat surface part 3 in the backward direction, as indicated by a solid line in FIG. 4, the connecting pin 11A of each pin-connecting part 11 is led in to a lower frontward direction along a hole shape of each lead-in hole 11B, and the slide pin 12A of each slide connecting part 12 is led in to the lower frontward direction along a hole shape of each lead-in hole 12B2.

Through this drop-down, the connecting pin 11A of each pin-connecting part 11 reaches the lower frontward end of each lead-in hole 11B, and the slide pin 12A of each slide connecting part 12 reaches the lower frontward end of each lead-in hole 12B2. Through this, the seat surface part 3 comes into a state in which the above drop-down of the seat surface part 3 in its gravity direction is locked. The drop-down of the seat surface part 3 in its gravity direction is locked when either of the connecting pins 11A or the slide pins 12A reach the ends of the lead-in holes 11B or the ends of the lead-in holes 12B2, and thus this locking may be done by carrying out either of them. Due to this drop-down, the slide pin 12A of each slide connecting part 12 comes into a state in which its movement toward the forward-unfolding direction around the connecting pin 11A of each pin-connecting part 11 is restricted, so that the seat surface part 3 comes into a state of being held at the position where the seat surface part 3 is in the folded-up posture.

Specifically, the lead-in hole 11B of each pin-connecting part 11 is formed in a shape more forwardly inclined than the lead-in hole 12B2 of each slide connecting part 12; thus, when the seat surface part 3 is dropped down in its gravity direction at the above position where the seat surface part 3 is folded up backward, the first support surface 3A is sunk down in a manner as to be slightly inclined backward while the first support surface 3A generally overlaps the front surface of the backrest surface part 2. With this configuration, when the seat surface part 3 is lifted up to the position where the seat surface part 3 is locked backward, there is no possibility of causing interference of the seat surface part 3 with the backrest surface part 2; therefore, it is possible to smoothly carry out the operation of dropping down the seat surface part 3 from the position where the seat surface part 3 is locked backward in its gravity direction, or the operation of lifting up the seat surface part 3 from the position where the seat surface part 3 is dropped down, without being hindered by interference with the backrest surface part 2.

Operation of returning the seat surface part 3 to the previous forward-unfolded posture 3D shown in FIG. 3 from the folded-up posture 3U in which the seat surface part 3 is lifted up backward, and is then dropped down in its gravity direction may be carried out by operating the seat surface part 3 in an inverse procedure to the above procedure. With such a simple operation, it is possible to switch the seat surface part 3 between the forward-unfolded posture 3D at the low position where the seated person P can lower his or her body to sit thereon, and the folded-up posture 3U at the high position where the seated person P can perch in the standing posture (see FIG. 5). Hence, in the above manner, the seat surface part 3 is used while the posture thereof is appropriately switched, to thereby properly prevent deterioration of blood circulation of the seated person P due to keeping sitting in a constant posture. In addition, the perching posture S2 can be taken on the seating surface inclined forwardly downward, to thereby properly promote blood circulation of calves in the perching posture S2 with comfortable sitting feeling.

Summarizing the above description, the seat 1 of the present embodiment example has the following configuration. Specifically, the seat (seat 1) having the seat surface part (seat surface part 3) serving as a stool for the seated person (seated person P) has the switching mechanism (switching mechanism 10) that can forwardly unfold down or backwardly fold up the seat surface part (seat surface part 3) by turning the seat surface part relative to the floor surface (floor surface F). With the switching mechanism (switching mechanism 10), the seat surface part (seat surface part 3) can be switched between the forward-unfolded posture (forward-unfolded posture 3D) in which the seat surface part (seat surface part 3) is forwardly unfolded down so that the first support surface (first support surface 3A) facing upward comes into a state at the low position where the seated person (seated person P) can lower his or her body to sit thereon (take the sitting posture SI), and the second support surface (second support surface 3B) facing frontward comes into a state in which the second support surface forms a backwardly inclined surface that is inclined backwardly downward, and the folded-up posture (folded-up posture 3U) in which the seat surface part is folded up backward from the forward-unfolded posture (forward-unfolded posture 3D) so that the second support surface (second support surface 3B) is lifted up at a higher position than the position of the first support surface (first support surface 3A) in the forward-unfolded posture (forward-unfolded posture 3D), and an upper surface inclined forwardly downward is formed by the backwardly inclined surface so that the second support surface comes into a state at the high position where the seated person (seated person P) can perch thereon in the standing posture (take the perching posture S2).

In this manner, with the switching of the posture of the seat surface part (seat surface part 3) by using the switching mechanism (switching, mechanism 10), the seat surface part (seat surface part 3) can properly be switched between the state corresponding to the perching posture (perching posture S2) (the folded-up posture 3U) and the state corresponding to the sitting posture (sitting posture S1) (the forward-unfolded posture 3D). Specifically, by the second support surface (second support surface 3B) forming the front surface inclined backwardly downward when the seat surface part (seat surface part 3) is in the forward-unfolded posture (forward-unfolded posture 3D), it is possible to form a space where the seated person's (seated person P's) crura can be placed backward when the seat surface part (seat surface part 3) is used in the forward-unfolded posture (forward-unfolded posture 3D), and it is also possible to reasonably form the seat surface inclined forwardly downward that is suitable for supporting the seated person's (seated person P's) buttock in the perching posture (perching posture S2) when the seat surface part (seat surface part 3) is used in the folded-up posture (folded-up posture 3U).

In addition, the switching mechanism (switching mechanism 10) includes the stopper (stopper 10A) that can restrict the forward fall-down of the seat surface part (seat surface part 3) in the folded-up posture (folded-up posture 3U). The stopper (stopper 10A) is a lead-in type locking mechanism configured such that by movement of drop-down of the seat surface part (seat surface part 3) in the downward direction from the turning position where the seat surface part comes into the folded-up posture 3U, the stopper (stopper 10A) locks the forward movement of the seat surface part (seat surface part 3) by abutting in the longitudinal direction.

With such a configuration, even when a longitudinal length of the seat surface part (seat surface part 3) in the forward-unfolded posture (forward-unfolded posture 3D) is set to be longer, it is possible to reasonably lower the height position of the second support surface (second support surface 3B) not to be too high by using the stopper (stopper 10A) that restricts the forward fall-down when the seat surface part (seat surface part 3) is folded up.

Furthermore, the switching mechanism (switching mechanism 10) includes: the pin-connecting parts (pin-connecting parts 11) turnably pin-connecting the seat surface part (seat surface part 3) to the bases (bases 4) on the floor surface (floor surface F); and the slide connecting parts (slide connecting parts 12) located at different positions from the positions of the pin-connecting parts (pin-connecting parts 11), the slide connecting parts being composed by combination of the slide pins (slide pins 12A) and the long holes (long holes 12B), the slide connecting parts connecting the seat surface part (seat surface part 3) and the bases (bases 4) to each other while the seat surface part and the bases are guided in a manner as to be relatively slid in the arc shape along with the turning around the pin-connecting parts (pin-connecting parts 11). The stopper (stopper 10A) is configured such that by folding up the seat surface part (seat surface part 3) to the turning position where the seat surface part comes into the folded-up posture (folded-up posture 3U) by the turning of the seat surface part 3 around the pin-connecting parts (pin-connecting parts 11), the respective pins (connecting pin 11A and slide pin 12A) corresponding to the pin-connecting parts (pin-connecting parts 11) and the slide connecting parts (slide connecting parts 12) are led into the lead-in holes (lead-in hole 11B and lead-in hole 12B2) respectively extending downward so as to restrict the forward fall-down of the seat surface part (seat surface part 3).

With such a configuration, it is possible to embody the switching mechanism (switching mechanism 10) having the stopper (stopper 10A) by using such a simple configuration that the respective pins (connecting pins 11A and slide pins 12A) corresponding to the pin-connecting parts (pin-connecting parts 11) and the slide connecting parts (slide connecting parts 12) that guide the movement of the seat surface part (seat surface part 3) are led into the respective lead-in holes (lead-in holes 11B and lead-in holes 12B2) at the turning position where the seat surface part comes into the folded-up posture (folded-up posture 3U).

As aforementioned, the embodiment of the present disclosure has been described using one embodiment example, but the present disclosure can be implemented in various other embodiments in addition to the above-described embodiment example. For example, the seat of the present disclosure may be widely applicable to seats provided for various vehicles and vessels including air planes and ships, in addition to seats installed in vehicles such as automobiles and railways. The seat of the present disclosure may be widely applied to seats provided for non-vehicles, such as furniture.

Furthermore, the second support surface forming the seating surface inclined forwardly downward when the seat surface part is in the folded-up posture may form a curved surface curved forwardly downward, instead of forming the flat inclined surface inclined forwardly downward. In addition, the stopper to restrict the forward fall-down of the seat surface part in the folded-up posture may be configured to lock the seat surface part by using lead-in in the seat-width direction, or to restrict the forward fall-down by using another lock mechanism separately provided, in addition to the locking mechanism of a lead-in type in the gravity direction as described using the above embodiment example.

What is claimed is:

1. A seat comprising:
a seat surface part serving as a stool for a seated person; and
a switching mechanism that forwardly unfolds down or backwardly folds up the seat surface part by turning the seat surface part relative to a floor surface,
wherein the seat surface part is switchable by the switching mechanism between a forward-unfolded posture in which the seat surface part is forwardly unfolded down so that a first support surface facing upward comes into a state at a low position where the seated person lowers his or her body to sit thereon, and a second support surface facing frontward comes into a state of forming a backwardly inclined surface that is inclined backwardly downward, and a folded-up posture in which the seat surface part is folded up backward from the forward-unfolded posture so that the second support surface is lifted up at a higher position than a position of the first support surface in the forward-unfolded posture, and an upper surface inclined forwardly downward is formed by the backwardly inclined surface so that the second support surface comes into a state at a high position where the seated person perches thereon in a standing posture,
wherein the switching mechanism includes a stopper that restricts forward fall-down of the seat surface part in the folded-up posture; and
the stopper has a lead-in type locking mechanism configured such that by movement of drop-down of the seat surface part in a downward direction from a turning position where the seat surface part comes into the folded-up posture, the stopper locks the forward movement of the seat surface part by abutting in a longitudinal direction.

2. The seat according to claim 1, wherein:
the switching mechanism includes a pin-connecting part turnably pin-connecting the seat surface part to bases on the floor surface, and a slide connecting part located at different position from position of the pin-connecting part, the slide connecting part being composed by combination of a slide pin and a long hole, the slide connecting part connecting the seat surface part and the bases to each other while the seat surface part and the bases are guided in a manner as to be relatively slid in an arc shape along with turning around the pin-connecting part; and
the stopper is configured such that by folding up the seat surface part to the turning position where the seat surface part comes into the folded-up posture by the turning of the seat surface part around the pin-connecting part, the respective pin corresponding to the pin-connecting part and the slide connecting part are led into lead-in hole respectively extending downward so as to restrict the forward fall-down of the seat surface part.

* * * * *